United States Patent [19]
Pao

[11] 3,790,252
[45] Feb. 5, 1974

[54] LIGHT CONTROLLED LIGHT BEAM DEFLECTOR

[75] Inventor: Yoh-Han Pao, Cleveland Heights, Ohio

[73] Assignee: Case Western Reserve University, Cleveland, Ohio

[22] Filed: Feb. 23, 1972

[21] Appl. No.: 228,635

Related U.S. Application Data
[63] Continuation-in-part of Ser. No. 7,609, Feb. 2, 1970, abandoned.

[52] U.S. Cl. ............. 350/160 R, 95/4.5, 350/160 P
[51] Int. Cl. .............................................. G02f 1/32
[58] Field of Search. 350/160 R, 160 P, 161, 161 P; 356/202

[56] References Cited
UNITED STATES PATENTS

| | | | |
|---|---|---|---|
| 3,497,285 | 2/1970 | Eden | 350/160 R |
| 3,529,886 | 9/1970 | Dixon et al. | 350/161 |
| 2,326,007 | 8/1943 | Capstaff | 356/202 |
| 3,617,779 | 11/1971 | Rosenberg | 350/160 P |
| 3,492,599 | 1/1970 | Rigrod | 350/160 P |
| 3,372,972 | 3/1968 | Schmidt et al. | 350/160 R |
| 3,552,824 | 1/1971 | Kiss | 350/160 P |
| 2,824,235 | 2/1958 | Hahn, Jr. et al. | 350/160 P |

*Primary Examiner*—Ronald L. Wibert
*Assistant Examiner*—V. P. McGraw
*Attorney, Agent, or Firm*—Frederic B. Schramm

[57] ABSTRACT

Deflection of a light beam is achieved by changing in a spatially non-homogeneous manner the refractive index of an interaction medium through which a controlled light beam and a controlling light beam pass at an angle to each other. The interaction medium is a substance in which large and rapid reversible changes in the refractive index may be produced by optical means. More specifically, the interaction medium consists of optically saturable dyes which may be either in liquid form that is in solution or in solid solution that is cast in plastics or may consist of suitable photoconductors. Optical pumping by the controlling beam at one frequency causes large changes in refractive index over a broad wavelength region and the changes may occur and decay in as short a time as $10^{-12}$ seconds.

27 Claims, 7 Drawing Figures

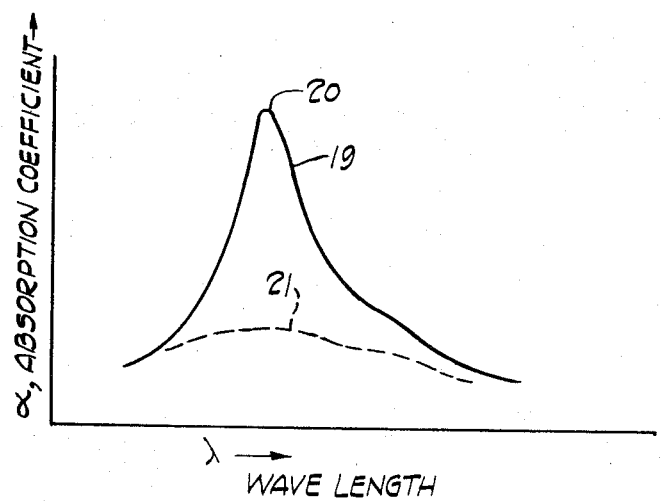
Fig. IA
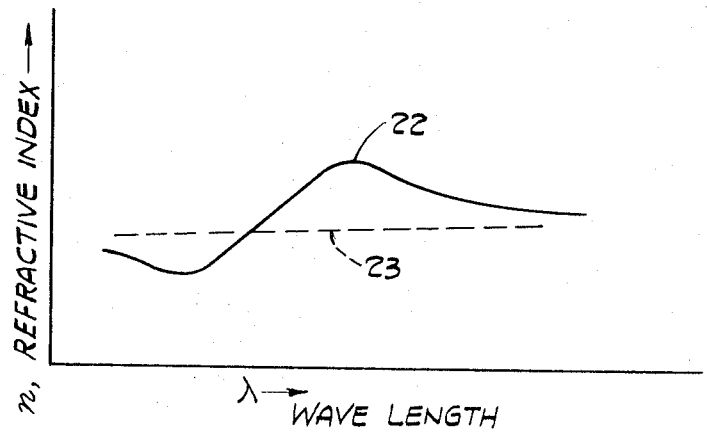
Fig. IB
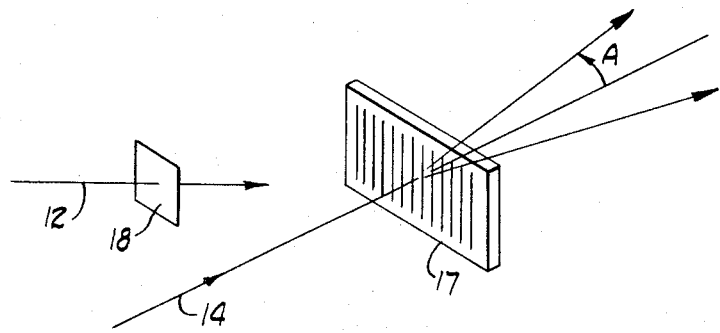
Fig. 3

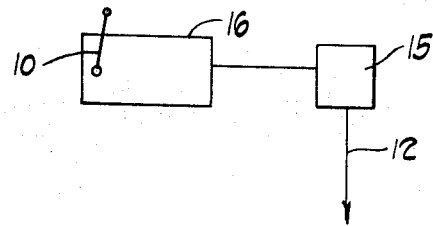
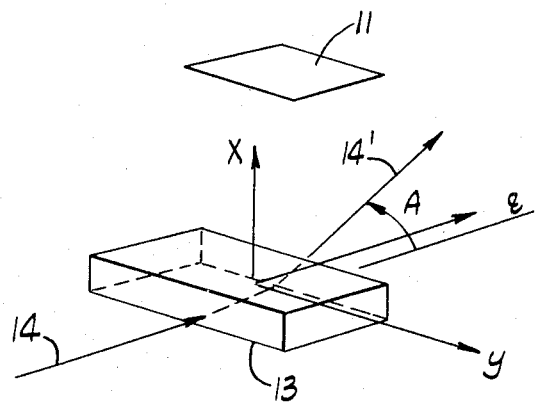
Fig. 2
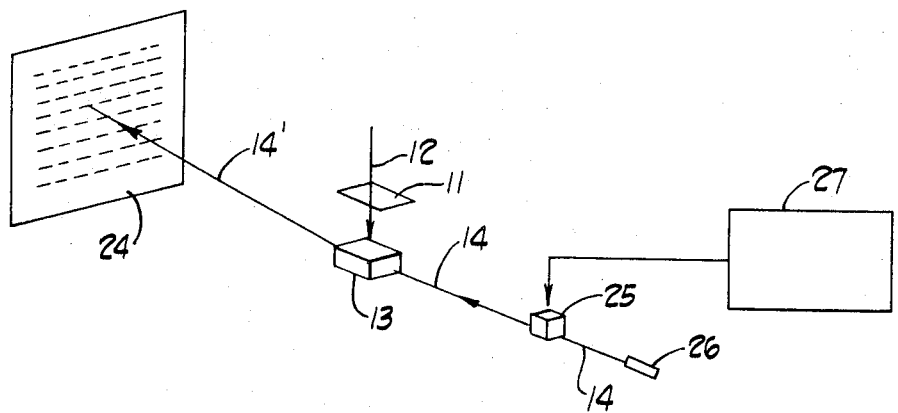
Fig. 4

PATENTED FEB 5 1974
3,790,252
SHEET 3 OF 3
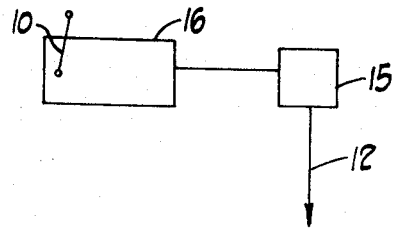
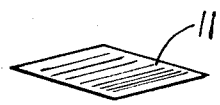
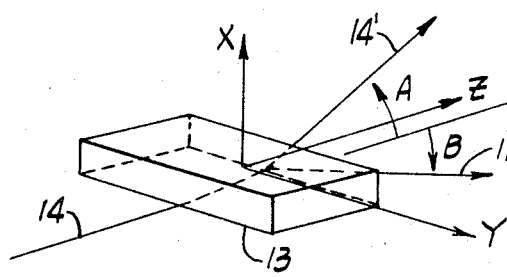
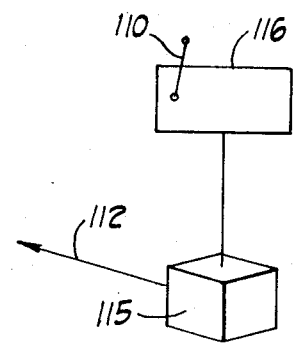
Fig. 5
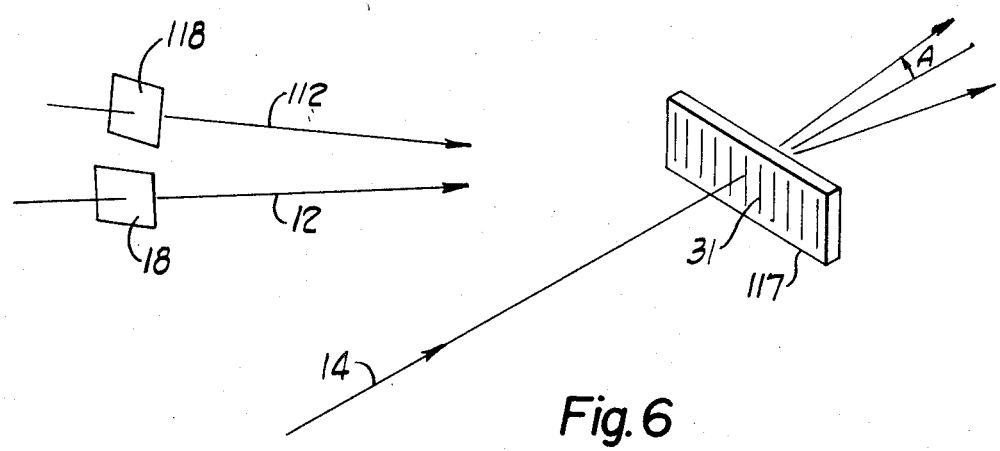
Fig. 6

LIGHT CONTROLLED LIGHT BEAM DEFLECTOR

This application is a continuation-in-part of co-pending U.S. Pat. application, Ser. No. 7,609, filed Feb. 2, 1970 now abandoned.

PRELIMINARY DESCRIPTION

The invention relates to the control of one light beam by another and has for its principal object the production of large spatially non-homogeneous changes in the index of refraction of an interaction medium and production of a wide angle of deflection of the controlled light beam passing through the interaction medium.

A further object is to achieve very rapid changes in the angle of deflection as well as rapid recovery after the controlling light beam is removed.

Still another object of the invention is to provide a deflecting light beam element which is operable over a wide bandwidth of frequencies.

Still another object of the invention is to provide a deflecting light beam element which may be employed in optical data processing, information storage and retrieval systems, photocomposition and the like.

Other and further objects, features and advantages of the invention will become apparent as the description proceeds.

The invention utilizes the phenomenon of optical saturation in certain highly absorbing dyes and optical detection to obtain very large and non-uniform changes in the index of refraction thereof to provide control of light beam deflectors hitherto unavailable. Such devices may operate upon unpolarized light and are suitable for operation over wide wavelength ranges even though the controlling light may be monochromatic and have a fixed wavelength. In devices according to the invention, the angle of deflection may be as large as 10° and the rate of address may be as high as giga steps per second.

The invention relates to the field of light beam deflectors and more particularly to beam deflectors which are not mechanically controlled and depend for their operation upon a spatially non-uniform pattern of refractive index in a material interaction medium.

Devices employing spatial and temporal refractive index variations in materials for deflecting light beams have heretofore been proposed. These devices may be classified into three categories. In one category, spatial variations in the optical path are built into the interaction medium and are not easily varied subsequently. Prisms and conventional diffraction gratings such as those used in spectrometers constitute well known examples of devices belonging to this first category. The deflection of the beam can be varied to some extent in some cases by applying force to the interaction medium such as by bending or the application of pressure. However, in such cases the deflection of the beam cannot be controlled or varied except in a gross manner and at a low rate.

In the second category, the desired refractive changes in the interaction medium are produced by applying external electric fields or magnetic fields or acoustic fields depending upon electro-optic, magneto-optic and acousto-optic coupling in the interaction medium for effective operation of the device. In accordance with the present invention much larger deflection may be obtained than with an electro-optic beam deflector. Utilizing presently known materials for electro-optic devices[1], large deflections of the order of 10° deflection for example, cannot be obtained from wedge-shaped devices for producing a constant field gradient. In another type of electro-optic beam deflector[2], light is propagated through a Kerr cell. There is a homogeneous change in the refractive index of the liquid in the cell as the field is changed; when a beam of light is propagated through the cell in direction other than normal to the liquid surface, ordinary refraction does result in the light being bent and when the refractive index is changed the direction of the beam is also changed. These deflectors have the shortcomings that very high fields are necessary to produce even small changes in refractive index and switching rates are low.

Although magneto-optical devices employing the constant gradient mode of operation have been proposed for producing large deflections, in practice it is difficult to produce large changes in the controlling magnetic field at high rates.

Acousto-optical devices have been described with effective band widths of about 60 megacycles. In these devices ultrasonic acoustic waves are used to produce density and consequently refractive index changes in the interaction medium[3]. In such devices the spatial patterns are to be used as diffraction gratings to deflect the secondary light beam. However, such devices would require large power and would be unlikely to attain band widths in excess of 100 megacycles. In addition these effective bandwidths refer to devices of apertures of millimeter or less and also refer to the scanning mode of operation. In random access operation, the true bandwidth of the device is of the order of 1 megacycle.

In the third category are deflection devices in which deflection of the beam is due to a change in refractive index and the change is also produced by light. However, these devices are quite different from the present devices and have inadequacies which are not found in the present devices. For example, in the light deflector described in J. F. Ready[4], the change in the refractive index is a non-linear and extremely weak phenomenon. The changes in the refractive index are homogeneous in all of the interaction area and the bending occurs because the non-linear medium (quartz) is placed next to another medium (glass). As is the usual case, the beam to be deflected is refracted or deflected on passing from one medium to another. When the refractive index of one substance is changed, the angle of refraction is changed and the extent of deflection is changed. The difficulties of this scheme are that for substances such as quartz the changes of refractive index are of the order of $10^{-6}$ even at light intensities which cause material damage. In contrast to these devices, the present device depends for its operation on spatially non-uniform changes in refractive index. Due to partial saturation of absorption bands the changes in refractive index are large being of the order of 0.1 rather $10^{-6}$. In this connection, I believe in this same category we may also mention devices which depend upon using a beam of light to control the absorption or refractive index of a substance such as a saturable dye, which then acts as a modulator[5] or variable reflectance output coupler[6] for another beam of light. However, this prior art does not pertain to beam deflection and does not involve spatially non-homogeneous patterns of refractive index.

I believe that light induced damage such as that produced in lithium niobate may be used to produce diffraction gratings and deflect light. However in that particular case, the healing or reverse action is brought about through heat and thus proceeds at a slow rate so that the action is essentially irreversible. In accordance with the preferred embodiment, therefore, I employ an interaction medium which responds at a very high rate of speed in either a forward or reverse action.

In contrast with arrangements which have heretofore been proposed, in accordance with the present invention the phenomenon of optical saturation in certain highly absorbing dyes and optical detectors is utilzied to obtain very large changes in index of refraction thereof. In this manner one light beam is used to control the deflection of another light beam and this operation may be carried out for large deflections and reversibly at high rates.

DRAWINGS

A better understanding of the invention will be afforded by the following detailed description considered in conjunction with tbe accompanying drawings in which FIG. 1 is a set of graphs of the optical characteristics of a saturable interaction medium, comparing the normal characteristics with those when the optical properties are changed by the controlling light beam so that the interaction medium is "bleached," showing in FIG. 1a absorption coefficient plotted in a vertical direction against wavelength plotted in a horizontal direction and showing in FIG. 1b the refractive index plotted in a vertical direction against wavelength.

FIG. 2 is a schematic diagram, partially in perspective, illustrating an embodiment of the invention utilizing an interaction medium comprising a body of dye solution in which refraction of the light beam takes place.

FIG. 3 is a schematic diagram illustrating the method of carrying out the invention utilizing a diffraction grating type of interaction medium, FIG. 4 is a schematic diagram illustrating the manner of employing a controlled light beam in photocomposition, and FIG. 5 is a diagram corresponding to FIG. 2 illustrating the manner in which deflection of tbe light beam is accomplished with respect to two different planes by means of different controlling beams at an angle to each other, and FIG. 6 is a diagram illustrating the manner in which a diffraction grating for the embodiment of FIG. 3 may be produced by interfering controlling light beams.

Like reference characters are utilized throughout the drawing to designate like parts.

DETAILED DESCRIPTION

In carrying out the invention advantage is taken of the manner in which the optical properties of a suitable interaction medium vary with the intensity of the controlling light. The two optical properties of interest are the real and imaginary parts of the refractive index. These quantities as functions of wavelength determine the propagation of the deflected beam. It is known that if either of these quantities is known for all wavelengths then the other is also known since the real and imaginary parts of the refractive index are related through the Kramers-Kronig Dispersion relationship. Physically the real part of the refractive index determines the manner of propagation and the imaginary part determines attenuation of the deflected beam. The real part of the refractive index is what has been known as the index of refraction in elementary physics and the imaginary part is what might be called the coefficient of absorption. The typical values for these quantities as they vary with wavelength are shown in the drawings, FIG. 1a representing the absorption coefficient and FIG. 1b the real part of the refractive index. I have found that a strong absorption is always accompanied by large changes in the refractive index near the absorption changes.

To display the Kramers-Kronig dispersion relationship between the refractive index and the absorption coefficient the two quantities are described in terms of one quantity called the complex refractive index.

$$\tilde{n} = (n - ik)$$

The real part of the refractive index is $n$ and is in fact the ordinary refractive index. It is related to $k$, the imaginary part through the relationship $$\text{Re}(\tilde{n}^2 - 1) = \frac{2}{\pi} P \int_0^{\infty} \frac{\text{Im } n^2(w)\, w\, dw}{w^2 - v^2} \quad (1)$$

where $$\text{Re}(\tilde{n}^2 - 1) = n^2 - k^2$$

$P =$ a constant, $w$ is the frequency in radians of the radiation in free space, in this case luminous radiation of the light beam and $d$ is the symbol signifying "differential."

and $$\text{Im } \tilde{n}^2 = 2nk$$

From equation (1) it is clear that if the absorption coefficient is known for all frequencies, then the refractive index is also known at any frequency $v$. This interdependence between the absorption coefficient and the refractive index is basic to the operation of this present device and this aspect is described in the following.

I have discovered that there are certain substances in which strong absorption is accompanied by a relatively low concentration of such absorbers so that it is possible with a moderately intense controlling beam of light to alter the population of the ground state of the molecules in the interaction medium. In such substances the interaction medium is relatwvely dilute from an adsorption standpoint or as an absorber. The substance is then saturated or bleached to some extent and both the absorption and the refractive index are changed and may for example, be represented by the dotted lines shown in FIGS. 1a and 1b. Because of the relationship between tbe absorption coefficient and the refractive index, when the former is changed the latter is also changed. Illustrative of substances which exhibit such behavior reversibly are cryptocyanines and the phthalocyanines such as metal free phthalocyanine as well as the metal substituted phthalocyanines, for example, copper substituted phthalocyanine. The invention is not limited to such dyes however, and does not exclude other dyes displaying these properties. Such saturable dyes may be in liquid form as illustrated, that is, in solution in a liquid or may be in solid solution, for example, cast in suitable plastics such as polymethyl methacrylate sold by various manufacturers under such trade names as "Lucite," "Pontalite" and "Plexiglas." Photoconductors may also be employed, particularly those of the type which have been used as optical detectors of radiant energy. Useful examples of such photodetectors are cadmium sulphide (CdS) and cadmium selenide (CdSe).

The criterion for saturation is that the following relationship is true, i.e., $$I\gamma\sigma/hv \geq 1 \qquad (2)$$

where $I$ is the intensity of the controlling light and is in units of ergs/cm$^2$/sec
$\gamma$ is the lifetime of the upper state in seconds
$\sigma$ is the absorption cross-section in cm$^2$
$hv$ is the energy of the incident photo (of the controlling beam) in ergs.
$h$ is a constant From equation (2) it is clear that excited states which have very small lifetimes would require high pumping intensities whereas operation in the infrared with consequent increases in and decreases in hv would mean that saturation can be obtained at very low frequencies. In both cases, decreases in $\gamma$ (the lifetime of the excited state) results in more rapid response or increased bandwidth of the device but entails the need for higher intensity of the controlling beam. In this connection the cryptocyanines and phthalocyanines are remarkable in that the lifetime of the upper state may be as short as $10^{-12}$ seconds and irradiation at any one wavelength in an absorption band results in bleaching over the whole absorption band. This latter feature provides additional freedom in the choice of the wavelength of the controlling beam, i.e., the deflected beam may be of appreciably different wavelength compared to the pumping light.

Certain semiconductors heretofore used as detectors of radiant energy such as optical and infrared detectors have been found suitable for use as optical interaction media. For instance, they may consist of salts of a metal from Group II of the Periodic Table of the Elements, such as cadmium and a non-metal from Group VI of the Periodic Table such as sulphur or selenium. Examples are cadmium sulphide and cadmium selenide which have large changes in refractive index due to the contribution to the refractive index by the free electrons produced by light. These photoconductors are absorbing at the wavelength of the controlling beam but are transparent at the wavelength of the deflected beam. For example, in the case of cadmium sulphide the band edge is 5,050 Angstroms. Beyond this band edge the become transparent and are for example, transparent in the red range of 6,900 Angstroms. Accordingly, in using such photoconductive material the controlling beam should have a wavelength less than 5,050 Angstroms and the controlled beam should have a greater wavelength for example, approximately 6,900 Angstroms.

In the operation of the present class of beam deflectors, use of a spatially non-homogeneous distribution of light flux in the controlling beam results in a spatially non-homogeneous distribution of refractive index and absorption coefficient.

In the embodiment of the invention illustrated in FIG. 2 a specially designed filter 11 is used to vary the intensity of a conrolling light beam 12 so that in the presence of that light, the refractive index of the interaction medium in a container 13 varies linearly across the wave front of a secondary beam of light 14, the one to be deflected. As illustrated the ccontrolling beam 12 is generated by suitable light source 15 such as a highpowered laser energized by a power supply 16. One or the other of the elements 15 and 16 is provided with suitable means for varying the intensity of the controlling beam 12. For example, the power supply 16 may be adjustable in output as represented schematically by a control handle 10. The secondary beam of light or the controlled beam 14 is emitted by any conventional source of light, not shown.

The filter 11 is so constructed that its density increases progressively, preferably linearly from one side to the other.

After passage through the filter 11 the intensity of the controlling beam 12 is not uniform across the front of the beam but increases in the positive y direction. Under the saturating action of the light from the source 15 the refractive index in the exposed volume in the container 13 holding the interaction medium als varies linearly with y. The secondary beam of light 14 is much less intense than the controlling beam 12 and produces no changes in the refractive index. However, since it propagates in a non-homogeneous medium, the effect of interference results in a bending of the beam 14' toward the direction of the higher refractive index, thus it is bent through tbe angle A from the axis Z.

The slope of the beam 14' is given by the equation $dy/dn = 1/n \times (dn/dy) \times z$ where $n$ is the real component of the index of refraction. The total deflection due to passage through a distance s of the medium in the container 13 is $A = (1/n) \times (dn/dy) \times s$ and the total lateral displacement is $\Delta y = (1/2n)(dn/dy) s^2 = \frac{1}{2}As$.

For $dn/dy = 2 \times 10^{-1}$, $n$ is approximately 1.2 and $s$ equals 1.

A equals $(1/1.2) \times 2 \times 10^{-1} \times 1 \times 57$ which is approximately 10°.

The ratio $dn/dy$ is assumed to be a constant since the filter 11 is designed for a uniform change in denssity.

The lateral displacement would be $\Delta y = (1/2) \times (0.2/1.2) \times 1 = 0.1$ cms.

If it is assumed that the material in the container 13 is a dye that absorbs red and an intense light beam 12, for example, from a ruby laser is caused to shine through the absorber in the container 13 the material no longer has tbe absorption property, that is to say it is no longer colored and thus becomes saturated or bleached so that it is colorless on reflection and transparent to another beam of light 14 coming through it. Thus, instead of being opaque to red light and allowing blue and green to go through, it has become transparent to all wavelengths of light. The amount of bleaching depends upon the intensity of the controlling beam 12 and varies across the wave front of the beam 12 and therefore along the y axis of the absorber 13 because of the progressively different density of the filter 11. Since as it is indicated in FIG. 1 the refractive index is related to the absorption, the result is that the refractive index and therefore the degree of deflection of the beam 14' depends upon the intensity of the controlling beam 12.

In an illustrative embodiment the absorber 13 is a glass or quartz cell or the like which is transparent and which contains a solution of a dye having the properties of cryptocyanine. Any suitable solvent may be used and satisfactory results have been obtained where the dye is dissolved in water.

By way of example in FIG. 2 the controlling beam and the secondary beam have been shown at right angles to each other. However, it is advantageous to have a relatively small angle between the two beams. This is illustrated in the embodiment of FIG. 3 where the controlling beam 12 is directed at a small angle to the secondary beam 14. In this case the interaction medium is in the form of a diffraction grating within a container 17.

The controlling beam of light 12 is used to project a diffraction pattern on to the interaction medium in the container 17. The pattern may either be due to a difference in absorption or in refractive index. On propagating through this diffraction pattern, the secondary beam of light is diffracted through large angles, these values being related to the diffraction spacing by the expression:

$A = \sin^{-1} L/2d$ where A is the diffraction angle and L is the wavelength and $d$ is the real component of the index of refraction.

In FIG. 2, upon employing a filter in which the density variation is linear, the bleaching effect in the interaction medium is also caused to be linear along the y axis.

In the embodiment of FIG. 3 what is done is to use light to print essentially a diffraction grating. A filter 18 is employed in this case which is not a simple absorption filter varying in density across its face but is itself a diffraction grating. The diffraction grating filter 18, therefore, utilizes the light of controlling beam 12 to image a diffraction grating on an interaction medium in the container 17. The diffraction grating 18 may, if desired, be of the type scribed with a ruling machine or may be made by optical methods by producing interference patterns photographically directly in the interaction medium. In this manner the intense light of the controlling beam 12 acts to bleach a diffraction grating in the interaction medium.

As shown in FIG. 6, a diffraction pattern 31 may be produced in the interaction medium in the container 117 by the use of controlling light beams 12 and 112 so arranged as to interfere, for example, by being directed on lines forming an acute angle and projected into the interaction medium in the container 117. For the production of variation in the effect of the diffraction pattern 31, one or both of the controlling beams 12 and 112 may have interposed therein filters 18 and 118, the density of which varies gradually or is graded across the face of the filter so as to produce gradual or graded variations in the deflecting effect of the interaction medium.

Dyes such as cryptocyanine and phthalocyanine are useful because the rearrangement time is very short so that the system can be driven very fast. In cryptocyanine and phthalocyanine the response to the controlling light takes place in a period of the order of $10^{-10}$ seconds. This is the time required for the controlling or saturating light beam to drive electrons in the molecules of the dye from the ground state to higher orders of excitation, higher energy levels, and for these electrons to fall back after the intense controlling beam is withdrawn. These substances also have the additional important quality that pumping at any one frequency saturates the optical properties over a large spectral range so that the deflected beam may be of appreciably different wavelength compared to the pumping light. Consequently, the controlling light beam may be of a given wavelength but used to control light beams varying over a wide range of wavelengths.

In the operation of beam deflectors constructed in accordance with the invention, use of a spatially non-homogeneous distribution of light flux in the controlling beam results in a spatially non-homogeneous distribution of refraction index and absorption coefficient.

What is meant by optical pumping is subjecting an interaction medium to light of such high intensity that the state of the molecules of the material is changed so that a significant number of the molecules oscillates at energy levels higher than the ground level. This means that those molecules in which the energy level has been raised no longer are abosrbers for the wavelength in question.

This phenomenon accounts for the so-called "bleaching" effect of an absorber subjected to high intensity light.

In FIG. 1a the curve 19 represents the variation of the absorption coefficient of the dye with wavelength under normal conditions. The fact that the curve peaks at the point 20 indicates that the dye is strongly absorptive to light of a particular wavelength or color so that only other wavelengths of light are reflected and this gives the dye its characteristic color. However, when the molecules of the dye are subjected to light of very high intensity the curve flattens out as indicated by the dotted line curve 21 so that the dye becomes substantially colorless or is "bleached" since there is relatively little differentiation between reflection and absorption at different wavelengths or colors of light.

In the FIG. 1b the curve 22 represents the variation in refractive index with wavelength whereas the substantially flat dotted line curve 22 represents the variation when the dye is subjected to the high intensity controlling light beam. In order to obtain this effect the dye must be very dilute in the absorbing sense although not necessarily in a physical or chemical sense. The molecules may be very large so that they tend to occupy a large part of the space in the solvent but may still be dilute in the sense of the number of electrons involved. Consequently, the controlling light beam is capable of causing a significant number of the molecules to oscillate at the higher energy levels representing the "bleached"condition.

In the embodiment of FIG. 4 a beam deflector of the type illustrated in FIG. 2 is employed with a radiation sensitive sheet 24 so mounted that the deflected beam 14' impinges upon it. This may be either a light sensitive or a heat sensitive paper for example. A light shutter 25 is interposed in the secondary light beam 14 from a light source 26 for controlling the presence or strength of the secondary light beam 14. The shutter may be controlled by a suitable means such as a computer 27. Any desired type of light shutter may be employed such as a Pockels cell for example. The Pockels cell is an example of a crystal in which the refractive index changes with the intensity of an applied electrical field and it may be so connected to the computer as to cause the strength of the controlled beam 14 to vary in response to the data output of the computer 27.

The beam deflector 13 serves to deflect the beam 14' back and forth in a horizontal line on the sheet 24 in response to variations in the strength of the controlling beam 12. It will be understood that for deflecting the beam vertically from one line to the next, a second beam deflector may be interposed which is similar to the deflector 13 except rotated through a 90° angle with a controlling beam entering from a horizontal direction instead of a vertical direction. The two means for deflecting the beam may be either of the type illustrated in FIG. 2 utilizing an absorber 13 and a filter 11 of transversely varying density or of the type illustrated in FIG. 3 in which each interaction medium consists of a diffraction grating as in the container 17 of FIG. 3.

For example, as illustrated in FIG. 5, in addition to the controlling light beam and the filter 11, a second controlling light beam 112 and a filter 111 interposed in the path of the beam 112 may be provided. The controlling light beam 112 may be produced in a manner similar to the controlling light beam 112 by means of a generator 115 having an intensity control 116 with an adjusting means 110. As shown, the controlling beams 12 and 112 are at an angle to each other and to the direction of the light beam 14, which is to be controlled. As previously described, the filter 11 is provided with a density which varies across its face transversely to the direction of the controlling beam 12 and the beam 14 to be controlled so that the beam 14 is deflected through the angle A to the position 14' in the plane of the YZ axes. Where two transverse controlling beams 12 and 112 are provided, there are two components of deflection, one through the angle A to the position 14' and the second through an angle B to the position 114'. The resultant of the deflections 14' and 114' is not shown to avoid confusion in the drawing. In the embodiment illustrated, the filter 11 is formed with density which is graduated or increases gradually in the direction parallel to the Y axis and the filter 111 is formed with a density which is graduated or varies gradually, increasing in the direction of the X axis.

The system illustrated in FIG. 4 accomplishes photocomposition in the following manner. The variation in strength of the controlling beam or beams 12 serve to cause the deflected beam 14' to scan the sheet 24. The data output of the computer 27 turns the light shutter 25 on or off so that marks or impressions are made on the sheet 24 for every position of the beam 14 at which the beam 14 is permitted to pass through shutter 25. In this manner black and white printing or drawing may be accomplished under the control of the computer 27. Shading is accomplished also for photocomposition of black and white photographs and pictures by utiliing the data output of the computer 27 to vary the strength of the beam 14.

In this manner the system illustrated in FIG. 4 may be employed for the data processing of tbe output of the computer 27 and the sheet 24 serves for information storage from which the information may be retrieved by optical methods. By substituting a luminescent sheet for the sheet 24 the system may be employed as an optical display system. For optical character recognition the beam deflector may be employed for scanning copy to be read and a photoelectric cell or the like may be employed for feeding responses in terms of changes in reflectivity of the light and dark portions of the copy into a computer synchronized with the sweep of the beam deflector scanners.

While the invention has been described as embodied in concrete form and as operating in a specific manner in accordance with the provisions of the Patent Statutes, it should be understood that the invention is not limited thereto, various modifications will suggest themselves to those skilled in the art without departing from the spirit of the invention.

REFERENCES

1. J. G. Skinner, U. S. Pat. No. 3,447,855
2. Massenstein, German Pat. No. 1,171,527
3. Acousto-optic Modulator manufactured by Orlando Research
4. J. F. Ready, U. S. Pat. No. 3,395,961
5. W. F. Kosonocky, U. S. Pat. No. 3,270,291
6. R. A. Gudmundsen, U. S. Pat. No. 3,444,478

What is claimed is:

1. A light beam deflector comprising in combination with means for generating a first light beam to be deflected:

an optically saturable interaction medium in solution disposed in the path of light emanating from said light beam generator, second means for generating a light beam for controlling the direction of the first and for projecting the controlling light beam through the interaction medium, and a filter having density, progressively increasing along its width, interposed in the path of the controlling beam for providing spatial variation of the intensity of the controlling beam transversely to the direction of the controlling beam for causing variation in the index of refraction of the interaction medium transversely to the controlling beam, thereby bending the first light beam.

2. A light beam deflector as described in claim 1 in which the means for generating the controlling beam is a coherent laser beam generator.

3. A light beam deflector as described in claim 2 including two controlling beam generators for producing two independent sets of controlling beams to achieve independent deflection in two directions.

4. A light beam controller as described in claim 1 in which the interaction medium is a solution of optically saturable dye.

5. A light beam controller as described in claim 1 in which the interaction medium is a solution of cryptocyanine.

6. A light beam controller as described in claim 4 in which the dye is phthalocyanine, substituted or nonsubstituted.

7. A light beam deflector as described in claim 1 in which the interaction medium is a dye containing molecules which are readily driven to higher energy levels by the application of intense light.

8. A light beam deflector as described in claim 7 in which the dye has high absorbency and is relatively dilute in the abosrbing sense.

9. A light beam deflector as described in claim 8 in which the dye has essentially the properties of cryptocyanine with respect to absorbency.

10. A light beam deflector as described in claim 1 in which the interaction medium is a dye having a relatively fast response and recovery time with respect to change in energy level state of molecules in response to intense light.

11. A light beam controller as described in claim 10 in which the response time is of the order of one billionth of a second or less.

12. A light beam deflector as described in claim 6 in which the dye is a copper substituted phthalocyanine.

13. A light beam deflector as described in claim 12 in which the means for generating the controlling light beam is a laser.

14. A light beam deflector as described in claim 1 in which the interaction medium is a substance subject to a bleaching effect when subjected to intense radiation and has the property of recovering its previous characteristics after change in the intensity of applied radiation within a time period of the order of billionths of a second.

15. A light beam controller as described in claim 5 in which the interaction medium comprises a substance having the property to a marked degree of electrons in the molecules being raised to a higher energy level when subjected to intense radiation.

16. A light beam controller as described in claim 5, in which the interaction medium comprises a substance for which the product of the intensity of the controlling light measured in ergs per square centimeter per second, the lifetime of the upper state of the atoms in seconds and the absorption cross-section in square centimeters divided by the energy of the incident photon of the controlling beam in ergs is no less than unity.

17. A light beam deflector comprising in combination with a light beam generator for generating a first light beam to be deflected:
   an optically saturable interaction medium disposed in the path of light emanating from said light beam generator,
   a second means for generating a light beam for con-controlling the direction of the first and for projecting the controlling light beam through the interaction medium and,
   a filter having density, progressively increasing along its width, interposed in the path of the controlling beam for providing transverse spatial variation of the intensity of the controlling beam, the controlling beam being projected on to the interaction medium with its intensity varying spatially transversely to the controlling beam and transversely to the first light beam across one face of the interaction medium in a nearly linear manner, for causing variation in the index of refraction of the interaction medium transversely to the controlling beam, thereby bending the first light beam.

18. A light beam deflector as described in claim 17 in which the areas of the cross-sections of the interaction medium perpendicular to the controlling beam are substantially equal along the controlling beam.

19. A light beam deflector as described in claim 17 wherein the interaction medium comprises a dye in dilute solution.

20. A light beam deflector as described in claim 17 in which the interaction medium comprises a semiconductor of the type serving as a detector of radiant energy.

21. A light beam deflector as described in claim 20 wherein the interaction medium comprises a compound of a metal in Group II of the Periodic Table, with a non-metal in Group VI of the Periodic Table.

22. A light beam deflector as described in claim 17 wherein the interaction medium comprises cadmium sulphide or selenide.

23. A light beam deflector comprising in combination with means for generating a first light beam to be deflected:
   an optically saturable interaction medium in solution disposed in the path of light emanating from said light beam deflector,
   second means for generating a light beam for controlling the direction of the first and for projecting the controlling light beam through the interaction medium, and
   means for providing spatial variation of the intensity of the controlling beam transversely to the direction of the controlling beam for causing variation in the index of refraction of the interaction medium transversely to the controlling beam, thereby bending the first light beam, the means for providing spatial variation of the intensity of the controlling beam taking the form of mechanism for causing the controlling beam to be projected onto the interaction medium with its intensity varying spatially in the form of a diffraction grating.

24. A light beam deflector comprising in combination with a generator for a first light beam to be deflected:
   an optically saturable interaction medium in solution disposed in the path of light emanating from said light beam generator,
   second and third generators of coherent light beams for controlling the direction of the first light beam and for projecting the second and third beams constituting controlling beams through the interaction medium, and
   means for providing spatial variation of the intensity of the second and third light beams, each transversely to its direction, and projecting each controlling beam onto the interaction medium with its intensity varying spatially transversely to itself and to the first light beam across one face of the interaction medium in a nearly linear manner for causing variations in the index of refraction of the interaction medium, each transversely to the direction of one of the controlling beams, thereby bending the first light beam, the coherent controlling beam generators being so related as to cause the second and third light beams to interfere and cause both second and third light beams to be projected through the interaction medium, whereby a desired diffraction pattern is produced in the interaction medium due to interference between said second and third light beams constituting two coherent controlling beams.

25. A light beam deflector comprising in combination with a light beam generator for generating a first beam to be deflected:
   an optically saturable interaction medium disposed in the path of light emanating from said light beam generator,
   second and third means for generating second and third light beams for controlling the direction of the first and for projecting the second and third light beams through the interaction medium, and filter means graded transversely for providing transverse spatial variation of the intensity of each of the second and third light beams, the second and third light beams being projected onto the interaction medium, each with its intensity varying spatially transversely to its own direction and transversely to the first light beam across one face of the interaction medium in a nearly linear manner, for causing variations in the index of refraction in the interaction medium, each transversely to one of the second and third light beams, thereby bending the first light beam, the second and third light beams constituting two independent controlling beams so that independent deflection of the first light beam in two directions may be achieved.

26. The method of deflecting a first light beam which comprises the steps of passing the light beam through an interaction medium comprising a dye of high absorption properties, projecting a second light beam through a graded filter and through the interaction medium at an angle to the first with the filter having a density increasing progressively along the width of the filter for causing the intensity of the second light beam to vary spatially transversely to the direction of the second beam in a prescribed manner and thereby varying the index of refraction of the interaction medium transversely to the second light beam.

27. The method of varying the deflection of a light beam which comprises the steps described in claim 26, in which the energy input to the second light beam is varied.

* * * * *